(12) United States Patent
Goy et al.

(10) Patent No.: US 10,794,493 B2
(45) Date of Patent: Oct. 6, 2020

(54) ELECTROMAGNETIC CARTRIDGE SEAL

(71) Applicant: Hamilton Sundstrand Corporation, Charlotte, NC (US)

(72) Inventors: Edward W. Goy, Crystal Lake, IL (US); Ryan Shook, Rockford, IL (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 220 days.

(21) Appl. No.: 15/707,191

(22) Filed: Sep. 18, 2017

(65) Prior Publication Data

US 2019/0090389 A1   Mar. 21, 2019

(51) Int. Cl.
    *F16J 15/34*   (2006.01)
    *F04D 29/14*   (2006.01)
    *F04D 29/12*   (2006.01)

(52) U.S. Cl.
    CPC ........ *F16J 15/3444* (2013.01); *F04D 29/126* (2013.01); *F04D 29/146* (2013.01); *F16J 15/346* (2013.01); *F16J 15/3492* (2013.01)

(58) Field of Classification Search
    CPC ...... F01D 25/18; F01D 25/183; F01D 25/186; F01D 9/065; F05D 2260/98; F16J 15/3444; F16J 15/346; F16J 15/3492
    USPC ........................................................ 277/378
    See application file for complete search history.

(56) References Cited

U.S. PATENT DOCUMENTS

| | | | | |
|---|---|---|---|---|
| 4,424,973 A * | 1/1984 | Heilala | ................. | F16J 15/3492 277/318 |
| 4,434,987 A * | 3/1984 | Albers | ................. | F16J 15/3444 277/317 |
| 4,447,063 A | 5/1984 | Kotzur et al. | | |
| 4,470,063 A * | 9/1984 | Arakawa | ................ | H01L 23/049 257/687 |
| 4,643,437 A * | 2/1987 | Salant | .................. | F16J 15/3432 277/319 |
| 4,671,677 A * | 6/1987 | Heshmat | ............... | F16C 33/746 277/347 |
| 4,844,138 A * | 7/1989 | Kokubu | ................ | B60C 23/003 152/417 |
| 5,064,205 A * | 11/1991 | Whitford | ............. | F16J 15/3436 277/317 |
| 5,730,447 A * | 3/1998 | Dawson | ............... | F16J 15/3444 277/378 |

(Continued)

FOREIGN PATENT DOCUMENTS

| | | |
|---|---|---|
| CN | 103711912 A | 4/2014 |
| DE | 2946787 A1 | 5/1981 |

(Continued)

OTHER PUBLICATIONS

Extended European Search Report for Application No. 18194809.2-1015, dated Feb. 15, 2019, 18 pages.

*Primary Examiner* — Nicholas L Foster
*Assistant Examiner* — L. Susmitha Koneru
(74) *Attorney, Agent, or Firm* — Cantor Colburn LLP

(57) ABSTRACT

Embodiments include an apparatus and techniques for operating an electromagnetic cartridge seal. Embodiments include operating a cartridge seal in one of a plurality of modes, and receiving a signal at a force applying mechanism of the cartridge seal, the force applying mechanism being coupled to a primary sealing component of the cartridge seal. Embodiments also include controlling the force applying mechanism based at least in part on the received signal.

16 Claims, 3 Drawing Sheets

(56) References Cited

U.S. PATENT DOCUMENTS

| | | | | |
|---|---|---|---|---|
| 5,746,435 A * | 5/1998 | Arbuckle | ............ | F16K 37/0091 |
| | | | | 277/304 |
| 5,865,441 A * | 2/1999 | Orlowski | ............. | F16J 15/3404 |
| | | | | 277/364 |
| 6,805,358 B2 * | 10/2004 | Dawson | ............... | F16J 15/3444 |
| | | | | 277/347 |
| 6,887,048 B2 * | 5/2005 | Hirata | ................... | F04D 29/146 |
| | | | | 277/378 |
| 8,474,826 B2 * | 7/2013 | Villeneuve | ........... | F16J 15/3444 |
| | | | | 277/377 |
| 9,097,347 B2 * | 8/2015 | Tissakht | ................... | F16J 15/38 |
| 2006/0006602 A1 * | 1/2006 | Roddis | ................ | F16J 15/3444 |
| | | | | 277/378 |
| 2008/0042364 A1 * | 2/2008 | Zheng | ................ | F16J 15/3444 |
| | | | | 277/378 |
| 2017/0045144 A1 * | 2/2017 | Khaira | ................ | F16J 15/3444 |

FOREIGN PATENT DOCUMENTS

| | | |
|---|---|---|
| DE | 3843288 A1 | 6/1990 |
| JP | 01242876 A | 9/1989 |

* cited by examiner

ELECTROMAGNETIC CARTRIDGE SEAL

BACKGROUND

The present invention relates to seals, and more specifically, to electromagnetic cartridge seals.

Mechanical seals are used with various types of pumps and fluid control mechanisms to prevent leakage between the stationary and moving components. One type of legacy seal utilizes a spring to apply a force on a carbon seal to maintain a seal between the sealing faces of the components. Other types of legacy seals use permanent magnets within the mechanical seal to maintain the contact of the sealing faces during operation. These configurations provide a static solution for sealing the couplings to the seal and the equipment such as a fluid pump. The proper functioning of these mechanical seals is critical to ensure the reliability of both the mechanical seals and the equipment they are coupled to.

BRIEF DESCRIPTION

According to one or more embodiments, methods for operating an electromagnetic cartridge seal are provided. Methods include operating a cartridge seal in one of a plurality of modes, receiving a signal at a force applying mechanism of the cartridge seal, the force applying mechanism being coupled to a primary sealing component of the cartridge seal, and controlling the force applying mechanism based at least in part on the received signal.

In addition to one or more of the features described herein, or as alternatives, further embodiments of the methods may include the force applying mechanism being an electromagnet, and the electromagnet being coupled to at least one secondary sealing component, a pump housing, and a rotor.

In addition to one or more of the features described herein, or as alternatives, further embodiments of the methods may include the primary sealing component being a carbon seal and the cartridge seal including at least one secondary sealing component, where the at least one secondary sealing component is an elastomeric seal.

In addition to one or more of the features described herein, or as alternatives, further embodiments of the methods may include the signal being an operator controlled signal, and the signal configuring the cartridge seal to operate in one of the plurality of modes.

In addition to one or more of the features described herein, or as alternatives, further embodiments of the methods may include the electromagnet being controlled by the signal responsive to at least one of an operator controlled signal or an inlet shut-off valve signal, where the signal is one of a voltage or current signal.

In addition to one or more of the features described herein, or as alternatives, further embodiments of the methods may include dynamically varying a position of the force applying mechanism based on a signal from an inlet shut-off valve, where the inlet shut-off valve is coupled to the cartridge seal and controls fluid entering a pump connected to the cartridge seal.

In addition to one or more of the features described herein, or as alternatives, further embodiments of the methods may include operating the cartridge seal in a wet mode, where the force applying mechanism makes contact with the primary sealing component during the wet mode.

In addition to one or more of the features described herein, or as alternatives, further embodiments of the methods may include operating the cartridge seal in a dry mode, where the force applying mechanism does not make contact with the primary sealing component during the dry mode.

In addition to one or more of the features described herein, or as alternatives, further embodiments of the methods may include the force applying mechanism not including a spring mechanism or permanent magnet.

In addition to one or more of the features described herein, or as alternatives, further embodiments of the methods may include the force applying mechanism includes a spring mechanism being coupled to the electromagnet.

According to one or more embodiments, systems for operating an electromagnetic cartridge seal are provided. The systems include a rotor, a primary sealing component coupled to the rotor, where the primary sealing component rotates with the rotor, and a force applying mechanism coupled to the primary sealing component and a housing of the electromagnetic cartridge seal.

In addition to one or more of the features described herein, or as alternatives, further embodiments of the systems may include the force applying mechanism being an electromagnet, where the electromagnet is coupled to at least one secondary sealing component.

In addition to one or more of the features described herein, or as alternatives, further embodiments of the systems may include the primary sealing component being a carbon seal and the cartridge seal including at least one secondary sealing component, where the at least one secondary sealing component is an elastomeric seal.

In addition to one or more of the features described herein, or as alternatives, further embodiments of the systems may include the electromagnet being controlled by the signal, responsive to at least one of an operator controlled signal or an inlet shut-off valve signal, where the signal is one of a voltage or current signal.

In addition to one or more of the features described herein, or as alternatives, further embodiments of the systems may include dynamically varying the force applying mechanism based on a signal from an inlet shut-off valve, where the inlet shut-off valve is coupled to the cartridge seal and controls fluid entering a pump connected to the cartridge seal.

In addition to one or more of the features described herein, or as alternatives, further embodiments of the systems may include operating the cartridge seal in a wet mode, responsive to a signal, where the force applying mechanism makes contact with the primary sealing component during the wet mode.

In addition to one or more of the features described herein, or as alternatives, further embodiments of the systems may include operating the cartridge seal in a dry mode, responsive to a signal, where the force applying mechanism does not make contact with the primary sealing component during the dry mode.

In addition to one or more of the features described herein, or as alternatives, further embodiments of the systems may include operating the cartridge seal in a dry mode, responsive to a signal, where the force applying mechanism makes contact with the primary sealing component during the dry mode.

In addition to one or more of the features described herein, or as alternatives, further embodiments of the systems may include the force applying mechanism not being a spring mechanism or permanent magnet.

In addition to one or more of the features described herein, or as alternatives, further embodiments of the systems may include the force applying mechanism includes a spring mechanism being coupled to the electromagnet.

BRIEF DESCRIPTION OF THE DRAWINGS

The following descriptions should not be considered limiting in any way. With reference to the accompanying drawings, like elements are numbered alike.

DETAILED DESCRIPTION

Legacy seals incorporate the use springs, permanent magnets, and/or other mechanisms to apply force to maintain a tight seal to prevent fluid leakage. This provides a static solution where its configuration is not readily changed without replacing or modifying the existing components.

Pumps are not always in operation and can operate in various modes. For example, an aircraft fuel pump may not always be in an active mode. An after-burner or augmenter pump is used to provide additional thrust when needed. During an active mode, fuel is being supplied to the pump where the fuel supplies the lubrication needed to prevent the premature wear of the seals. Therefore, this type of pump spends the majority of its time in an inactive, dry state where fuel is not being constantly provided to the pump and cartridge seal. During this mode, the fuel pump may be dry where the cartridge seal is not required to prevent any fuel leakage to other parts of the aircraft because there is no constant supply of fuel. However, if the cartridge seal continues to maintain contact during the dry mode, the sealing component of the cartridge seal can lose lubrication, further causing the sealing component to become hot and wear due to the friction generated between the moving parts. Generally, the fluid that is being retained in the pump by the seal provides the needed lubrication for the moving parts. As the sealing component (carbon seal) makes contact with the rotating face of the shaft during operation, it experiences wear over time. The integrity of this seal is critical to ensure proper operation of the pump, maintaining fluid levels, protecting the environment from leaking toxic chemicals, etc.

By implementing a pump and cartridge seal that incorporates an electromagnet during the operation of the wet and dry modes, the life of the seals can be increased. In addition, the electromagnet that is integrated into the system that replaces the spring and/or permanent magnet of the other solutions, further increases the reliability of the seals which requires less replacement parts and maintenance, and reduces the overall cost of the seal. Also, the loads applied by the electromagnet against the carbon seal of the cartridge seal are more uniform and provide for better control.

Figure 1:
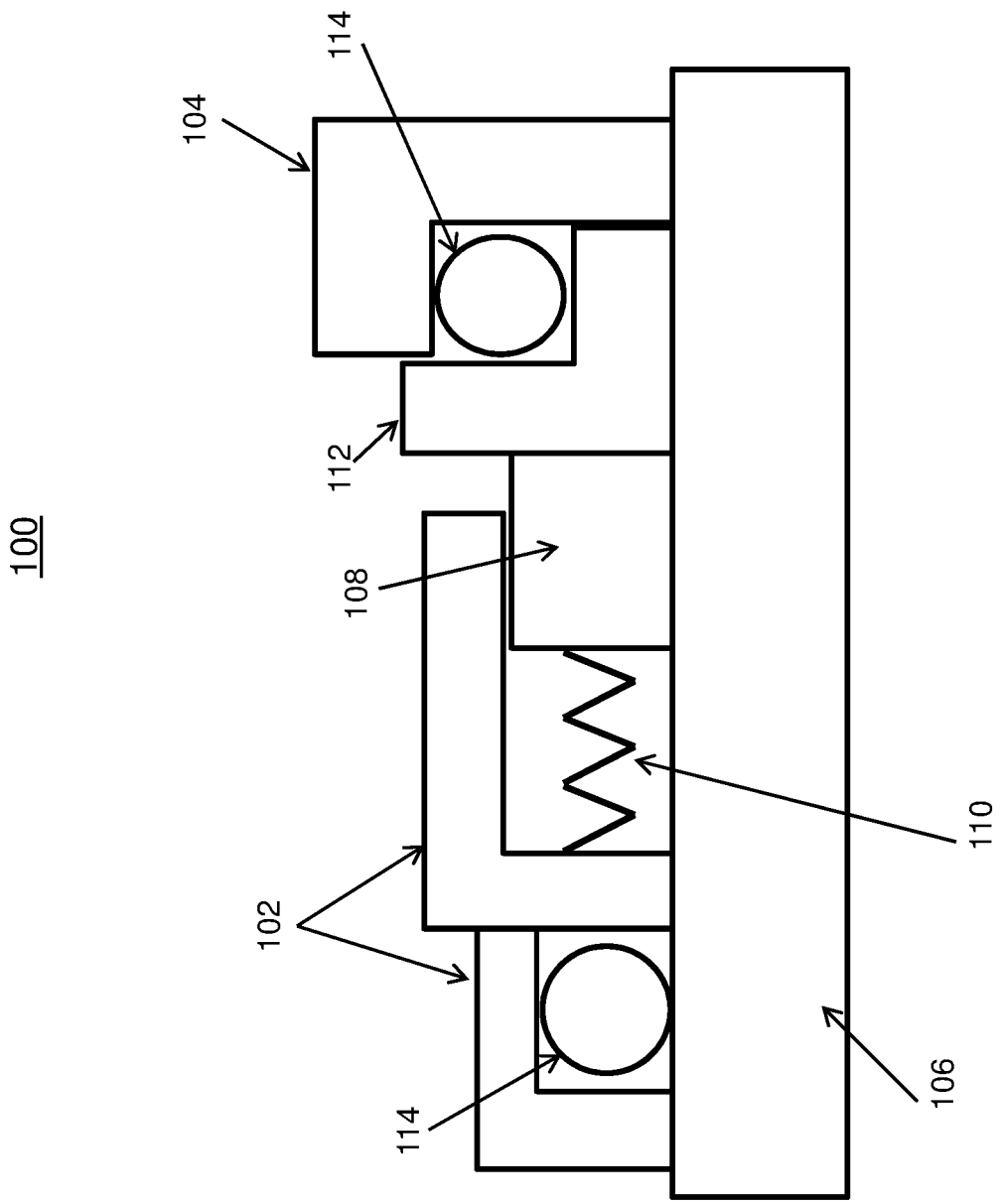
FIG. 1 depicts a block diagram of a prior art seal.

Now referring to FIG. 1, a seal 100 used for operating a mechanical seal is shown. The seal 100 includes a cartridge housing 102 and pump housing 104. Each of the housings 102, 104 include other components which are used for performing the sealing function during operation. The seal 100 includes a rotor (shaft) 106. The rotor 106 can be part of a pump or other device for controlling fluid.

The spring 110 is coupled to the carbon seal 108 to maintain a primary seal between the carbon seal 108 and the stationary face 112 as the carbon seal 108 wears over time. The carbon seal 108 is coupled to the shaft 106 and rotates with the shaft 106 during operation. The stationary face 112 can be affixed to the pump housing 104 and stays stationary during the operation of the rotor. The primary seal maintains the fluid within the seal 100 as the shaft 106 rotates. The fluid maintained within the seal 100 provides lubrication for the primary seal between the carbon seal 108 and the stationary face 112. The lubrication prevents the carbon seal 108 from prematurely wearing and also reduces the heat generated by the friction between the carbon seal 108 and the stationary face 112.

In addition to the carbon seal 108, secondary seals 114 are used to provide seals with the cartridge housing 102 and rotor 106 and also the pump housing 104 and stationary face 112. The secondary seals 114 can be elastomeric seals, such as O-rings, and assist in preventing fluid leakage at other points within the seal 100.

Figure 2:
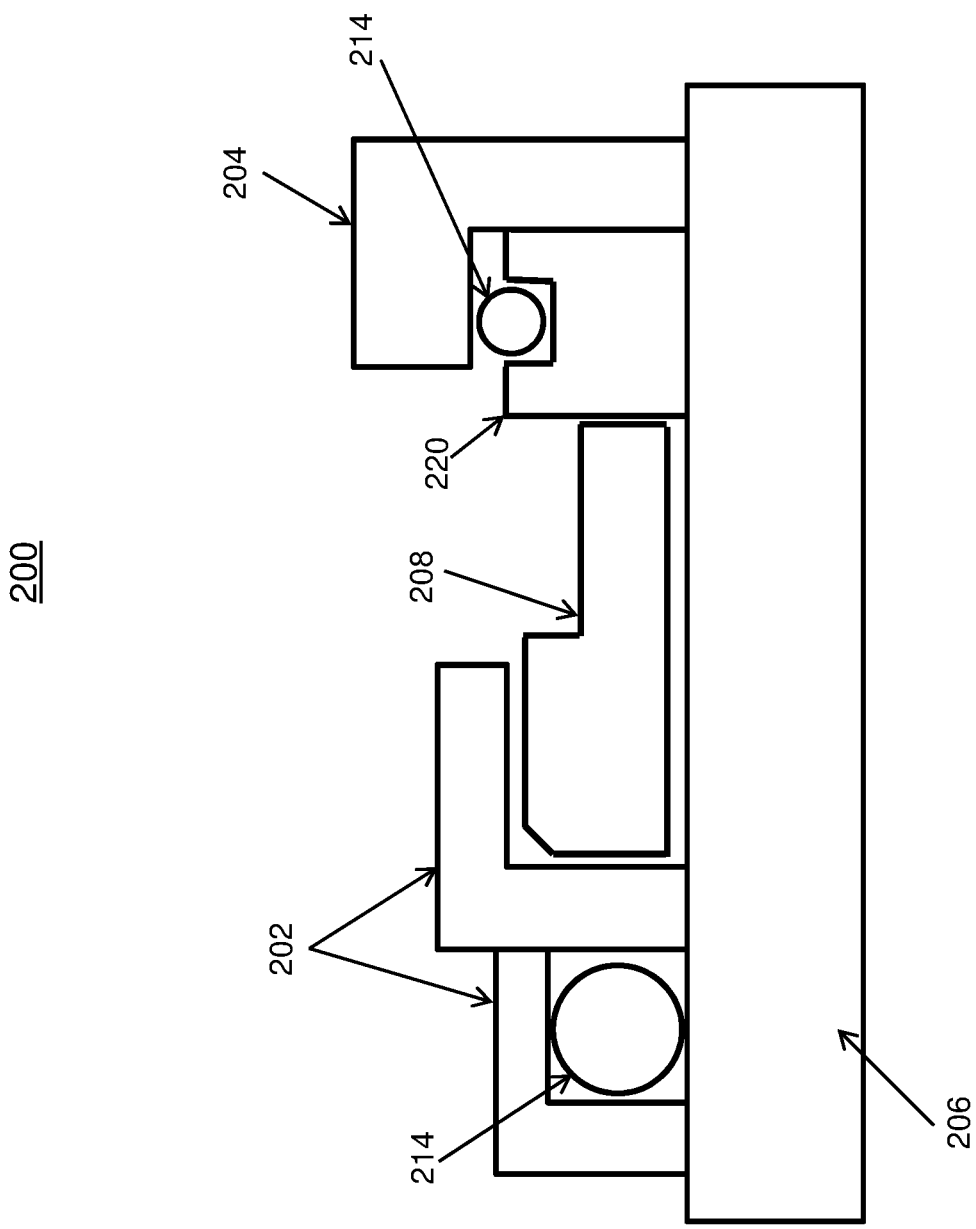
FIG. 2 depicts a block diagram of an electromagnetic cartridge seal.

Now referring to FIG. 2, an electromagnetic cartridge seal 200 in accordance with one or more embodiments is shown. The electromagnetic cartridge seal 200 is a cartridge seal used for preventing fluid leakage for example, when coupled to a pump or other fluid controlling device. The electromagnetic cartridge seal 200 includes the cartridge housing 202 and the pump 222 and pump housing 204. The electromagnetic cartridge seal 200 is coupled to a rotor or rotating shaft 206. The electromagnetic cartridge seal 200 also includes a carbon seal 208 which is used to form the primary seal for preventing fluid leakage of the pump or other coupled device. In addition to the primary carbon seal (primary sealing component) 208, secondary seals 214 are used to form a seal with the cartridge housing 202 and rotor 206 and also the pump housing 204 and the electromagnet 220. The secondary seals 114 can be elastomer O-rings and assist in preventing leakage at other points in the seal 100.

The electromagnet 220 is used not only as a face to form a primary seal with the carbon seal 208, but the electromagnet 220 is also used as the force applying mechanism to ensure the primary seal stays engaged as the carbon seal 208 wears over time.

In one or more embodiments, the carbon seal can operate in a plurality of modes. For example, the load applied to the electromagnet can be varied to operate with a very low load or no load during the dry operation. Also, the load applied to the electromagnet can range between no load and a maximum load during operation. In one or more embodiments, the electromagnetic cartridge seal 200 can transition to wet mode operation by selectively applying a signal to engage the electromagnet 220 to form a tight seal. In other embodiments, the load applied the electromagnet can be increased/decreased based on a received signal.

In one or more embodiments, the electronics for controlling the pump and seal already exists in the systems and can be leveraged by the techniques described herein. For example, the signals used to control the inlet shut-off valve 224 for the fluid entering the pump can also be used to control the electromagnet 220 of the electromagnetic cartridge seal 200. In other words, a common signal can be used to control the mode of operation. In one or more embodiments, the electromagnet is varied during operation without replacing any of the components in the sealing system.

In one or more embodiments, the electromagnet is used without the use of a spring compression or permanent magnet. In other embodiments, the electromagnet can be coupled to a spring where the spring provides a minimal load to the electromagnet. The techniques described herein are applicable to not only fuel but also to oil or any other type of fluid environment where sealing is selectively necessary.

Figure 3:
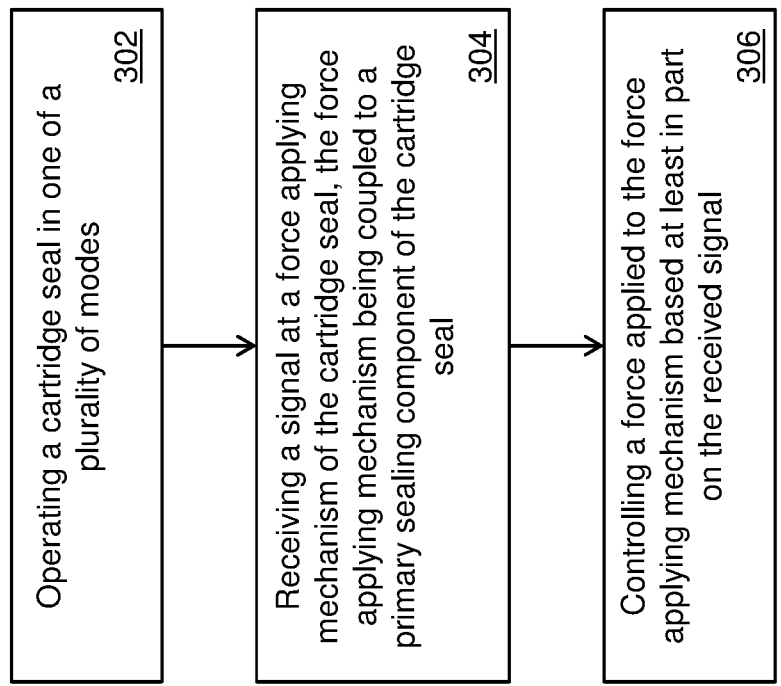
FIG. 3 depicts a flow chart for a method of operating an electromagnetic cartridge seal.

Now referring to FIG. 3 a method 300 for operating a cartridge seal is provided. Block 302 provides operating a cartridge seal in one of a plurality of modes. In one or more embodiments, the plurality of modes includes a wet mode and a dry mode. A dry mode occurs when the rotor coupled to the cartridge seal is in an operational state when fluid is not present or may be low in the cartridge seal. A wet mode occurs when the cartridge is filled with fluid during operation.

Block 304 provides receiving a signal at a force applying mechanism of the cartridge seal, the force applying mechanism being coupled to a primary sealing component of the cartridge seal. In one or more embodiments, the force applying mechanism is an electromagnet. The electromagnet is coupled to a primary seal of the cartridge seal to ensure there is not leakage in the coupling between the cartridge seal and rotor or other coupled device.

Block 306 provides controlling the force applying mechanism based at least in part on the received signal. In one or more embodiments, a signal can be a voltage or current signal that is used to control the force applying mechanism, the electromagnet. The signal is used to switch modes of the cartridge seal. For example, the mode can be switched between a dry mode of operation and a wet mode of operation. In an embodiment, the dry mode can provide no load or a small load to the electromagnet, where the contact between the electromagnet and the primary seal is minimal. In an embodiment, the wet mode can provide a sufficient load to maintain the seal between the electromagnet and the primary seal to ensure no leakage will occur during operation. As the primary begins to wear over time, the load applied to the electromagnet can be increased to compensate for the wear and the gap created between the electromagnet and the primary sealing component. In a different embodiment, the cartridge seal can switch modes to the dry mode based on the received signal.

The techniques described herein leverages existing components of the systems and can operate in both wet and dry modes to extend the life of the seals. The electromagnet provides a uniform load to the carbon seal which provides for efficient operation of the cartridge seal. The combination of the seal and the electromagnet can be applied to various types of applications that require sealing.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for operating an electromagnetic cartridge seal, the method comprises:
    operating a cartridge seal in one of a plurality of modes, wherein the plurality of modes includes a dry mode and a wet mode, wherein the cartridge seal is filled with a fluid when operating in the wet mode, wherein the cartridge seal does not have fluid present when operating in the dry mode;
    receiving a signal at a force applying mechanism of the cartridge seal, the force applying mechanism being coupled to a primary sealing component of the cartridge seal, wherein the force applying mechanism is an electromagnet;
    switching between the plurality of modes; and
    controlling the force applying mechanism based at least in part on the received signal, wherein the force applying mechanism makes contact with the primary sealing component when operating the cartridge seal in the wet mode.

2. The method of claim 1, wherein the electromagnet is coupled to at least one secondary sealing component, a pump housing, and a rotor.

3. The method of claim 2, wherein the primary sealing component is a carbon seal and the cartridge seal includes the least one secondary sealing component, wherein the at least one secondary sealing component is an elastomeric seal.

4. The method of claim 1, wherein the signal is an operator controlled signal and wherein the signal configures the cartridge seal to operate in one of the plurality of modes.

5. The method of claim 2, wherein the electromagnet is controlled by the signal responsive to at least one of an operator controlled signal or an inlet shut-off valve signal, wherein the signal is one of a voltage or current signal.

6. The method of claim 3, further comprises dynamically varying the force applying mechanism based on a signal from an inlet shut-off valve, wherein the inlet shut-off valve is coupled to the cartridge seal and controls fluid entering a pump connected to the cartridge seal.

7. The method of claim 1, further comprises operating the cartridge seal in the dry mode, wherein the force applying mechanism does not make contact with the primary sealing component during the dry mode.

8. The method of claim 1, further comprises operating the cartridge seal in the dry mode, wherein the force applying mechanism makes contact with the primary sealing component during the dry mode.

9. A system for operating an electromagnetic cartridge seal, the system comprises:
    a rotor;
    a primary sealing component coupled to the rotor, wherein the primary sealing component rotates with the rotor; and
    a force applying mechanism coupled to the primary sealing component and a housing of the electromagnetic cartridge seal, wherein the force applying mechanism is an electromagnet;
    wherein the cartridge seal is configured to switch between the plurality of modes, wherein the plurality of modes includes a dry mode and a wet mode, wherein the cartridge seal is filled with a fluid when operating in the wet mode, wherein the cartridge seal does not have fluid present when operating in the dry mode, wherein the force applying mechanism makes contact with the primary sealing component when operating the cartridge seal in the wet mode.

10. The system of claim 9, wherein the electromagnet is coupled to at least one secondary sealing component.

11. The system of claim 9, wherein the primary sealing component is a carbon seal and the cartridge seal includes at least one secondary sealing component, wherein the at least one secondary sealing component is an elastomeric seal.

12. The system of claim 10, wherein the electromagnet is configured to receive a signal, wherein the signal configures the cartridge seal to operate in one of a plurality of modes.

13. The system of claim 12, wherein the signal is at least one of an operator controlled signal or an inlet shut-off valve signal, wherein the signal is one of a voltage or current signal.

14. The system of claim 10, wherein the force applying mechanism is a dynamically variable force applying mechanism that operates based on a signal from an inlet shut-off valve, wherein the inlet shut-off valve is coupled to the cartridge seal and controls fluid entering a pump connected to the cartridge seal.

15. The system of claim 9, wherein the force applying mechanism does not contact the primary sealing component when operating in the dry mode.

16. The system of claim 14, wherein the force applying mechanism contacts the primary sealing component when operating in the dry mode.

* * * * *